(12) United States Patent
Zlatkov et al.

(10) Patent No.: US 10,683,027 B2
(45) Date of Patent: Jun. 16, 2020

(54) METHOD FOR PRODUCING A COVERED STEERING WHEEL FOR A VEHICLE

(71) Applicant: VOLKSWAGEN AKTIENGESELLSCHAFT, Wolfsburg (DE)

(72) Inventors: Branislav Zlatkov, Braunschweig (DE); Markus Danschacher, Braunschweig (DE); Bernd Soltendieck, Braunschweig (DE); Henrik Oelbke, Wasbuettel (DE); Thorsten Richter, Lehre (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 132 days.

(21) Appl. No.: 15/933,864

(22) Filed: Mar. 23, 2018

(65) Prior Publication Data

US 2018/0208228 A1    Jul. 26, 2018

Related U.S. Application Data

(63) Continuation of application No. PCT/EP2016/071457, filed on Sep. 12, 2016.

(30) Foreign Application Priority Data

Sep. 24, 2015   (DE) .................. 10 2015 218 424

(51) Int. Cl.
*B32B 37/12*   (2006.01)
*B62D 1/06*    (2006.01)
(Continued)

(52) U.S. Cl.
CPC ............ *B62D 1/06* (2013.01); *B32B 37/1207* (2013.01); *B29C 63/0069* (2013.01);
(Continued)

(58) Field of Classification Search
CPC .................. B62D 1/06; B32B 37/1207; B32B 2037/1223; B32B 2037/123;
(Continued)

(56) References Cited

U.S. PATENT DOCUMENTS 5,251,506 A   10/1993   Itagaki
5,792,302 A    8/1998   Nakada et al.
(Continued)

FOREIGN PATENT DOCUMENTS

DE       1922356 U      8/1965
DE       6943597 U      9/1970
(Continued)

*Primary Examiner* — Sarang Afzali
*Assistant Examiner* — Ruth G Hidalgo-Hernandez
(74) *Attorney, Agent, or Firm* — Muncy, Geissler, Olds & Lowe, P.C.

(57) ABSTRACT

A method for producing a covered steering wheel for a vehicle. A steering wheel skeleton is overmolded with a matrix material. A covering material is coated on its non-visible side with an activatable material. The coated covering material is applied to the overmolded steering wheel skeleton so that its non-visible side faces the overmolded steering wheel skeleton. Longitudinal edges of the covering material are joined together. The activatable material is activated with creation of an integral connection between the covering material and the matrix material.

12 Claims, 3 Drawing Sheets

(51) Int. Cl.
  *B29C 63/00* (2006.01)
  *B29L 31/30* (2006.01)
  *B68F 1/00* (2006.01)

(52) U.S. Cl.
  CPC . *B29L 2031/3047* (2013.01); *B32B 2037/123* (2013.01); *B32B 2037/1223* (2013.01); *B32B 2037/1238* (2013.01); *B68F 1/00* (2013.01)

(58) Field of Classification Search
  CPC .............. B32B 2037/1238; B68F 1/00; B29C 63/0069; B29L 2031/3047
  See application file for complete search history.

(56) References Cited

U.S. PATENT DOCUMENTS

| | | |
|---|---|---|
| 5,840,144 A | 11/1998 | Schumacher et al. |
| 2013/0214467 A1 | 8/2013 | Heyn et al. |
| 2013/0276573 A1 | 10/2013 | Henning et al. |
| 2018/0105077 A1 | 4/2018 | Aktas |

FOREIGN PATENT DOCUMENTS

| | | |
|---|---|---|
| DE | 2716449 A1 | 10/1978 |
| DE | 4129664 A1 | 3/1992 |
| DE | 4120647 C1 | 8/1992 |
| DE | 10 2007 031 014 A1 | 1/2009 |
| DE | 10 2010 029 188 A1 | 11/2011 |
| DE | 10 2010 027 157 A1 | 1/2012 |
| DE | 10 2010 063 440 A1 | 6/2012 |
| EP | 1964751 A2 | 9/2008 |
| GB | 2298263 A | 8/1996 |
| JP | S6011572 A | 1/1985 |
| JP | H0459474 A | 2/1992 |
| JP | H0459476 A | 2/1992 |
| JP | H04215562 A * | 8/1992 |
| JP | H09202244 A | 8/1997 |
| JP | 2011063083 A | 3/2011 |
| JP | 2014-094728 A | 5/2014 |

* cited by examiner

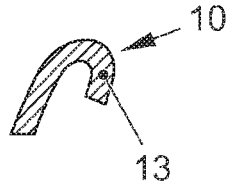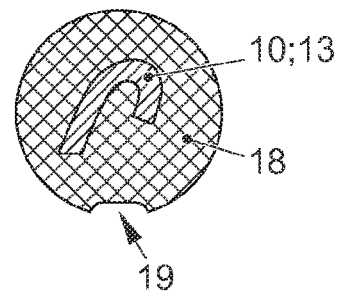
FIG. 2A    FIG. 2B
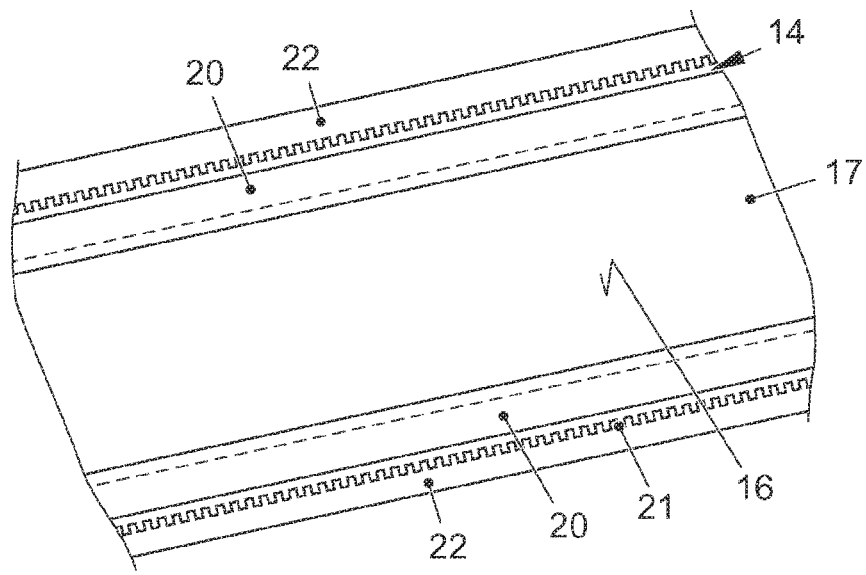
FIG. 2C
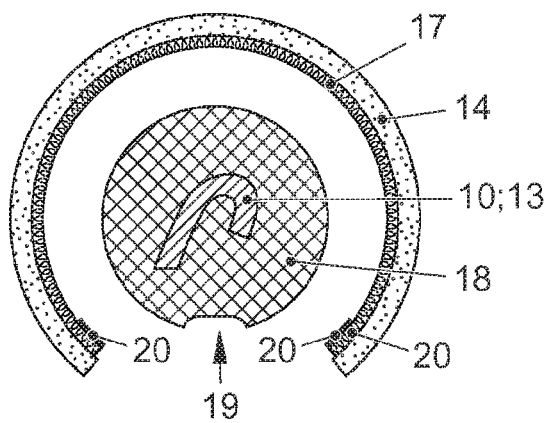
FIG. 2D

METHOD FOR PRODUCING A COVERED STEERING WHEEL FOR A VEHICLE

This nonprovisional application is a continuation of International Application No. PCT/EP2016/071457, which was filed on Sep. 12, 2016, and which claims priority to German Patent Application No. 10 2015 218 424.2, which was filed in Germany on Sep. 24, 2015, and which are both herein incorporated by reference.

BACKGROUND OF THE INVENTION

Field of the Invention

The present invention relates to a method for producing a covered steering wheel for a vehicle, in particular for a motor vehicle.

Description of the Background Art

Prior art steering wheels include a steering wheel skeleton, often metallic or made of hard plastic, which is encased in a space-filling matrix, usually a plastic foam. As a general rule, the matrix material defines the functional, geometric shape of the steering wheel. A cover, for example made of leather or artificial leather or a textile, usually encloses the matrix as the final, visible layer.

For production, the covering material is typically cut to the appropriate final size and is sewed together into a ring by machine, with a longitudinal slit still remaining open. An adhesive is then manually applied to the overmolded steering wheel or to the non-visible side of the covering material, the steering wheel is covered, and the longitudinal seam is manually closed by stitching.

DE 6943597 U and DE 1922356 U describe closing the longitudinal seam of a removable steering wheel cover with one or more zippers.

DE 10 2010 029 188 A1 describes a method for producing a steering wheel for a motor vehicle, wherein the steering wheel skeleton is enclosed with a covering material, after which the space between the covering material and the steering wheel skeleton is foamed in with a space-filling cladding material.

Other methods for producing a covered steering wheel for a vehicle are known from the following documents: DE 10 2007 031 014 A1, DE 10 2010 027 157 A1 (which corresponds to US 2013/0214467), DE 10 2010 063 440 A1 (which corresponds to US 2013/0276573), and EP 1 964 751 A2.

SUMMARY OF THE INVENTION

It is therefore an object of the present invention to provide a method for producing a covered steering wheel for a vehicle that leads to reproducible results and can be carried out rapidly and economically and preferably with a minimum of manual work steps.

In an exemplary embodiment of the invention, a method for producing a covered steering wheel for a vehicle, in particular for a motor vehicle, that includes the steps: providing a steering wheel skeleton overmolded with a matrix material, coating (laminating) a covering material on its non-visible side with an activatable material, applying the coated covering material to the overmolded steering wheel skeleton so that its non-visible side faces the overmolded steering wheel skeleton, joining longitudinal edges of the covering material together, and activating the activatable material with creation of an integral connection between the covering material and the matrix material.

The creation of an integral connection between the covering material and the matrix material enclosing the steering wheel skeleton achieves a reliable adhesion that even makes it possible to dispense with a separate closing of a longitudinal seam of the covering material where appropriate. Because the integral connection is brought about by means of the activatable material that coats the covering material, an extremely reproducible connection is obtained in terms of strength and layer thickness.

Within the scope of the invention, an "activatable material" is understood to be any material that is capable of creating an integral connection with the matrix material in an appropriate, subsequent processing step (the activation step), for example through thermal action. In other words, at the time when it is coated and at the time when the coated covering material is applied to the overmolded steering wheel skeleton, the activatable material still has little or no sticky characteristics, e.g., adhesive characteristics. These characteristics do not come fully into play until the subsequent activation step. This makes applying the coated covering material to the overmolded steering wheel skeleton, and hence producing the adhesive connection, easier and faster.

In an embodiment of the invention, the activatable material can be an activatable adhesive, and the integral connection is an adhesive bond. Heat-activated hot melt adhesives can be the activatable adhesive, for example. The advantage of activatable adhesives is that a variety of suitable products of this type are available, and automatable techniques are available for their processing.

The activatable material can be a non-foamable or foamable material. In an embodiment of the method, the activatable material is a foamable material that foams when activated, or in other words forms a foam. The advantage of a foamable material is that it expands during foaming, and thus fills in gaps and compensates for manufacturing tolerances of the substrate. In addition, the haptic characteristics of the steering wheel are improved. It is a matter of course that the foamable material also produces an integral connection, for example by the means that a foamable activatable adhesive is used. Suitable foamable materials include, for example, curable polyurethane compositions (PU compositions).

The activatable material can be applied to the covering material in various forms, for example as a powder, film, mat (in particular a spun-bonded fabric), mesh, paste, and/or fluid. Accordingly, various coating techniques, in particular laminating and/or lining techniques, come into consideration. The application of the activatable material to the covering material preferably is carried out mechanically, for example by mechanical automation, in order to lower the cost of application and ensure quality.

The activation of the activatable material can be carried out in any manner desired, largely determined as a function of the activatable material used. For example, the activation can comprise a thermal treatment, a chemical treatment, an irradiation, and/or a pressure action. The activation can be accomplished by thermal treatment and/or irradiation, in particular IR-irradiation, since these processes are simple and quick to implement and lend themselves well to integration into automated methods.

The covering material should be cut to size (prefabricated) to the requisite final measurement at the time of its application to the overmolded steering wheel skeleton. In this context, the cutting to size can take place before or after coating with the activatable material. The cutting to size can take place after the coating with the activatable material, since the coating process is easier to automate in this way, for example as part of a rolling process or the like.

In an embodiment, it is useful for the covering material to be assembled from multiple longitudinal segments. In these cases, the individual segments are connected, in particular stitched to one another (sewn together), to form a closed ring, but one whose longitudinal joint is not yet closed, prior to application to the overmolded steering wheel skeleton.

The steering wheel skeleton can at least be partially overmolded and/or foam-coated with a matrix material before the application of the coated covering material. In particular, in this step the creation of a shape-giving matrix takes place, which embeds at least portions of the steering wheel skeleton, and defines the desired geometry of the steering wheel, including, in particular, with respect to its functionality and ergonomic characteristics. In most cases, the steering wheel skeleton is overmolded with locally different matrix material thicknesses and/or incompletely; for example, only a thin overmolding, or none at all, is generally applied to the steering wheel hub, and in some cases the steering wheel spokes as well, so that only the steering wheel rim is overmolded with the matrix material in a relatively thick material layer. In an embodiment of the invention, the provision of the steering wheel skeleton that is overmolded with a matrix material includes a foam-coating of the steering wheel skeleton with the matrix material. Foam-coating is a special form of overmolding. Polyurethane foams or physically foamable materials are examples of materials that come into consideration for the foamable matrix material, as well.

In addition to the covering material, the matrix material can also be coated on its exterior with an activatable material prior to application of the covering material. This can be the same activatable material as the activatable material applied to the covering material. Depending on the material combination, however, it can also be useful for the coating of the matrix material to use an activatable material that differs from the activatable material of the covering material but is chemically compatible therewith and, for example, supports the bonding effect of the activatable material of the covering material. The activatable material of the matrix material can be applied to the full area thereof; however, it can also be sufficient or advantageous to apply the activatable material to the matrix material only in some places. For example, the bonding effect of the activatable material of the covering material may, under certain circumstances, be inadequate at geometrically unfavorable places—for instance at the transition of the steering wheel spokes to the steering wheel rim; at such places, a chemically compatible, activatable material can additionally be applied to the exterior of the matrix material in order to support the bonding effect.

In an embodiment, it is also possible to apply only one activatable material to the matrix material, and to dispense with an application of activatable material to the covering material prior to enclosing the steering wheel skeleton that is overmolded with the matrix material. In this case, instead of the covering material, it is the matrix material that is coated on its exterior with an activatable material after the overmolding of at least sections of the steering wheel skeleton, and the covering material is applied to the steering wheel skeleton that is overmolded with the coated matrix material, so that the coated exterior of the matrix material faces the covering material. The remaining process steps of the method according to the invention remain unchanged. However, it is simpler in process terms to coat the flat covering material, which has an essentially two-dimensional shape, with an activatable material prior to its application to the overmolded steering wheel skeleton than to coat the matrix material, which has a three-dimensional shape, with an activatable material after the overmolding of at least sections of the steering wheel skeleton.

The process step of joining the longitudinal edges of the applied covering material can include, for example, sewing, gluing, or welding of the longitudinal edges to one another, and/or the like.

According to an embodiment of the method, zipper halves (rows of zipper teeth) are attached to the longitudinal edges of the covering material prior to application, and are closed after the application of the coated covering material to the overmolded steering wheel skeleton. The use of a zipper has the advantage that the joining of the longitudinal edges of the covering material is made very simple and fast. Furthermore, advantageous visual design effects can be achieved by means of the zipper.

The zipper halves can be designed as a single piece or can include multiple segments. Coil zippers, especially ones made of plastic, have proven to be especially well suited. The attachment of the zipper halves to the longitudinal edges can be accomplished by sewing, gluing, and/or welding. In so doing, the zipper halves can be attached such that the zipper remains visible in the closed state or, for example, is concealed by the covering material, which is to say that the longitudinal edges of the same are edge-to-edge or overlap after the zipper is closed.

The zipper can be attached at the inner circumference of the steering wheel rim. In this case the zipper is visually unobtrusive in its arrangement, and its position corresponds essentially to the location of seams in conventionally produced and stitched zippers. However, in this case the transitions between the steering wheel rim and the steering wheel spokes, which generally are also located on the inner circumference of the steering wheel rim, interfere with the use of a zipper that runs continuously along the entire arc of the steering wheel rim. If, in contrast, the zipper is attached at the outer circumference of the steering wheel rim or at the back—from the vehicle driver's viewpoint—of the steering wheel rim, facing away from the vehicle driver, then in general the use of a zipper that runs continuously along the entire arc of the steering wheel rim is possible. In these cases as well, the zipper is visually unobtrusive in its arrangement on the steering wheel.

In an embodiment, after the application of the coated covering material to the overmolded steering wheel skeleton, the longitudinal edges of the covering material are joined to one another by the closure of zipper halves. Next, or in a later process step, longitudinal edges that are already joined together by a zipper are additionally joined together by stitching, and a zipper is overstitched in the process. Since the longitudinal edges are already joined together by a zipper at the time of stitching, the stitching of the longitudinal edges is significantly easier and faster than before. Namely, when the longitudinal edges are stitched by overstitching a zipper, the longitudinal edges no longer need to be held in position since they are already joined together in the correct position by the zipper. It is possible to continuously overstitch a zipper that is employed; depending on the geometric relationships at the steering wheel, however, it may also be more advantageous to overstitch a zipper that is employed with multiple separate stitches, and/or to overstitch it only in some places.

In an embodiment of the method, the matrix material enclosing the steering wheel skeleton can have a recess in the region of the joined longitudinal edges of the covering material, which thus extends along the joint seam. In this way, an increase in the thickness of the covering resulting from the joint is accommodated by the recess, and no undesirable bulging occurs at the joint. This is advantageous, especially when a zipper is used to join the longitudinal edges.

An embodiment of the present invention also relates to a covered steering wheel that can be produced with the method according to the invention.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIGS. 2A-2G process sequence of a method for producing a steering wheel according to a second form of the invention: (2A) steering wheel skeleton in a sectional view; (2B) steering wheel skeleton with overmolded or foam-coated matrix; (2C) coated covering material in a top view with zipper; (2D) application of the covering material; (2E) steering wheel with partially closed zipper; (2F) sectional view of the steering wheel after closure of the zipper in a first variant embodiment and (2G) of the steering wheel after closure of the zipper in a second variant embodiment.

DETAILED DESCRIPTION

The process sequence of a first embodiment of the method according to the invention for producing a steering wheel shall be described below with reference to FIGS. 1A-1F on the basis of the intermediate products in different process stages.

Figure 1A:
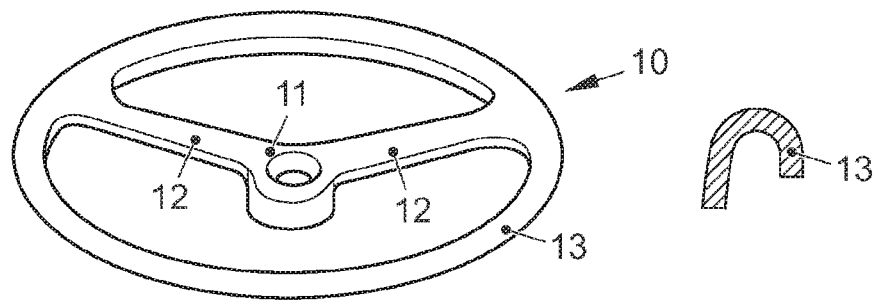
FIGS. 1A-1F illustrates a process sequence of a method for producing a steering wheel according to a first form of the invention: (1A) steering wheel skeleton in a perspective view and as a sectional view; (1B) blank of the covering material in a top view and as a sectional view before and after coating; (1C) steering wheel skeleton (cross-section) with overmolded or foam-coated matrix; (1D) steering wheel after application and joining of the covering material; 1(E) finished steering wheel after activation of the activatable material in a first variant embodiment, and (1F) finished steering wheel after activation of the activatable material in a second variant embodiment.

To start with, in a first step of the method, a steering wheel skeleton, which is labeled as a whole with 10 in FIG. 1A, is provided. The steering wheel skeleton 10 includes a steering wheel hub 11, from which any desired number (here: two) of steering wheel spokes 12 proceed radially and transition into a circumferential steering wheel rim 13. On the right-hand side of FIG. 1A, the steering wheel rim 13 is shown in a sectional view. It can be seen that the steering wheel rim 13 in this example is designed as an essentially U-shaped profile. Normally, the steering wheel skeleton is made of a metallic material, for example magnesium or a magnesium alloy, and can be obtained in a die casting process, for example. Subsequently, the steering wheel skeleton 10, in particular the steering wheel rim 13, is to be overmolded with a matrix material and enclosed with a covering material.

Figure 1B:
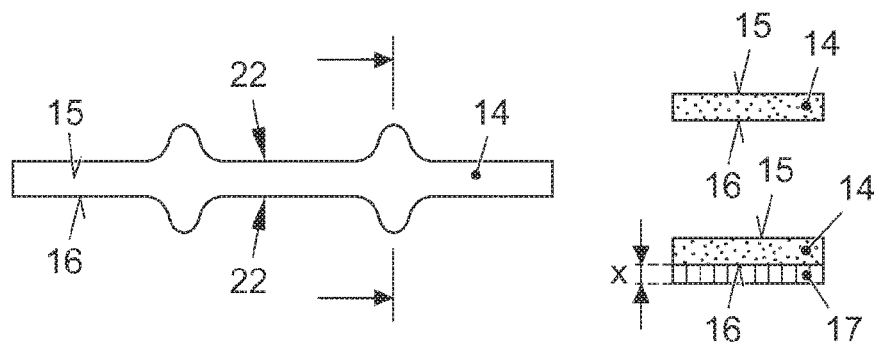

In another step, a cutting to size and coating (lamination) of the covering material with an activatable material takes place. On the left-hand side, FIG. 1B shows a top view of an unrolled blank of a covering material 14. For example, leather, artificial leather, a textile material, or any desired type of artificial material may serve as covering material. Shown on the right-hand side of FIG. 1B is a sectional view of the covering material 14 before and after it has been coated. The covering material has a visible side 15 and a non-visible side 16. The activatable material 17 is applied to the non-visible side 16. The letter X identifies a height, the height of the coating (coating thickness). It can be any desired thickness, for example 20 to 2000 μm, and is dependent on a variety of requirements and the material used, etc.

A material that is capable, after a suitable activation (see below), of producing an integral connection with the covering material 14 and also with the matrix material of the overmolded steering wheel rim 10 is used as the activatable material 17. The activatable material can develop adhesive characteristics, which is to say that an activatable adhesive, for example a hot melt adhesive, is used as the activatable material 17. Suitable hot melt adhesives include, e.g., ethylene vinyl acetate (EVA), ethylene vinyl acetate copolymers, modified polyolefins, polyester, etc. Additional suitable adhesive substances include polyurethanes, polymers based on acrylate or acrylic acid monomers, polyvinyl alcohol, silicones, synthetic elastomers, and natural rubber compositions. A thermoplastic polyurethane composition (mixture of polyol and isocyanate) can be used, which can be employed as a powder, in particular.

The coating technique can, in principle, be configured in any desired manner, and depends on the type of activatable material 17, in particular on whether this material is used in the form of a powder, a melt, a solution or dispersion, as a preformed layer in the form of a film or a mesh, or a mat, for example spun-bonded fabric. Accordingly, wet and dry coating, coatings with or without solvents, thermal coating, and other options are employed. If the activatable material 17 is available as a powder, solution, dispersion, or melt, then doctor-blade or spray techniques can be used. If the activatable material 17 is already preformed as a layer in the form of a film or a mesh or the like, then laminating or lining techniques are used, wherein the material 17 can also be provided on a carrier film in order to prevent the activatable material 17 from adhering prematurely. This carrier film is removed before or after the coating.

The coating of the non-visible side 16 of the covering material 14 with the activatable material 17 can take place before the covering material is cut to size in its exemplary shape shown in FIG. 1B; in other words, it is first coated and then the coated covering material 14 is cut to size (prefabricated). The cutting-to-size may be accomplished by cutting or stamping.

Figure 1C:
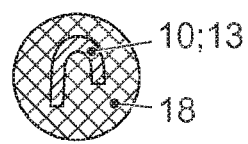

In a further process step, the result of which is shown in FIG. 1C, an overmolding, for example, a foam-coating, with a matrix material 18 occurs of the steering wheel skeleton 10 or of parts thereof, in particular of the steering wheel rim 13. Known injection molding processes using injection molds are employed for this process step. The product of this process step is thus a matrix 18, in which the steering wheel skeleton is present and embedded. The matrix 18 defines the desired shape of the steering wheel and in doing so takes into account, in particular, ergonomic requirements, safety requirements, and visual design aspects. A foam-coated steering wheel skeleton is also referred to as a foam steering wheel part in the technical terminology. One of the materials mentioned for the activatable material, for instance, may be used as the matrix material 18. In particular, a thermoplastic polymer, for example polyurethane, is employed. All of the aforementioned materials can be foamed with a physical foaming process, for example by saturating the polymer mass with supercritical $CO_2$ and releasing the latter under a sudden drop in pressure and/or sudden increase in temperature. Some of the aforementioned materials can also be foamed chemically, for example in that the polymer composition releases a gaseous component under heating. Chemical and physical foaming processes or foam-coating processes are known to the person skilled in the art.

Figure 1D:
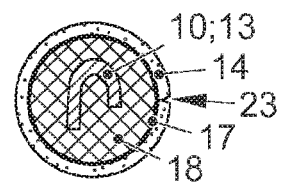

In a next process step, an application of the coated material 14 to the overmolded steering wheel skeleton 13 (the foam steering wheel part), in particular the steering wheel rim 13, takes place. In this process, the covering material 14 is arranged such that its non-visible side, which is to say its coated side, faces the overmolded steering wheel skeleton 10, 13. The short ends of the blank of the coating material 14 can be joined to one another, for example stitched, glued, or welded, prior to the application of the coated covering material 14 to the overmolded steering wheel skeleton 10. This process can be performed mechanically. After the application of the coated covering material 14 to the overmolded steering wheel skeleton 10, the longitudinal edges 22 of the covering material 14 are joined together to produce a joint or seam 23. Here, too, the joining can be accomplished by, for example, sewing, gluing, or welding. The result of the application of the covering material 14 to the overmolded steering wheel rim 13 is illustrated in FIG. 1D. Here, reference number 17 identifies the as-yet-unactivated activatable material, and 23 identifies the seam of the longitudinal sides 22 of the covering material 14.

In a next process step, an activation of the activatable material 17 takes place in order to create an integral connection between the covering material 14 and the matrix material 18 enclosing the steering wheel skeleton 10. The type of activation is determined by the type of activatable material, and can include the application of heat, irradiation, in particular infrared irradiation, application of pressure, pressing, chemical activation, etc. If, for instance, the activatable material 17 is a hot melt adhesive, the activation of the adhesive bond is accomplished by external heat input, for example in an oven, or by IR irradiation. In a special embodiment, the steering wheel is equipped with a steering wheel heater. In this case, the thermal activation of the activatable material 17 can take place using the steering wheel heater. The activation temperature employed should be matched to the temperature resistance of the covering material.

Figure 1E:
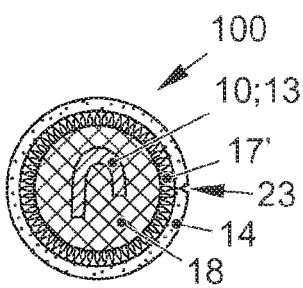
Figure 1F:
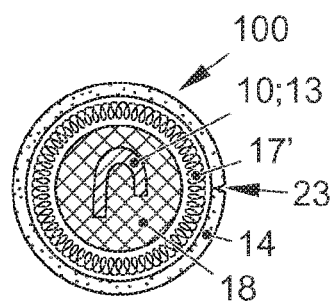

The result of the activation step is shown in FIG. 1E. Here, 17' identifies the activated, and in this example foamed, material, which has only undergone slight expansion as a result of the activation in the example shown. FIG. 1F shows an alternative example, in which the activated material 17' is expanded (foamed) to a much greater degree. The extent of foaming and expansion can be regulated by factors including the coating thickness x (see FIG. 1B), with which the activatable material 17 has been applied to the covering material 14. It is also possible to provide different coating thicknesses x over the area of the covering material 14 that is to be coated in order to obtain different degrees of expansion in the product. In this way, different haptic characteristics, for example, can be produced along the circumference of the steering wheel rim 13.

After activation, the steering wheel 100 is an end product, and can be installed, in particular in a motor vehicle, if applicable with additional equipment.

An embodiment of the method according to the invention for producing a steering wheel 100 is illustrated in FIGS. 2A-2G on the basis of different process stages and intermediate products. Corresponding elements are labeled here with the same reference characters as in FIG. 1, and are not explained again in detail. Only the differences are discussed below. The method in FIG. 2 differs from the one in FIG. 1 in that a zipper is used for joining the longitudinal edges of the covering material.

FIG. 2A again shows a sectional view through the steering wheel rim 13 of a steering wheel skeleton 10. The latter is overmolded or foam-coated with a matrix 18 (see FIG. 2B), as described in FIG. 1. In the present optional embodiment, the matrix 18 is designed with a recess or groove 19, which extends, in particular, along a rear side of the steering wheel rim 13. The purpose of the recess 19 is to accommodate the zipper and prevent it from causing a bump.

According to the embodiment of the invention illustrated here, the covering material 14 is equipped with zipper halves 20 (FIG. 2C) on its non-visible side 16, which has already been coated with the activatable material 17. For example, the zipper halves 20 are arranged along the longitudinal edges 22 of the covering material 14 and joined, for example stitched, thereto. In this case, the zipper halves 20 are arranged such that the zipper teeth 21 face toward the open longitudinal edges 22 of the covering material 14. The zipper teeth 21 can be concealed by the longitudinal edges 22 of the covering material 14 or be exposed. Unlike what is shown in FIG. 2C, the coating of the covering material 14 with the activatable material 17 can also take place after the application of the zipper halves 20. This is associated with a higher process cost, however.

Figure 2E:
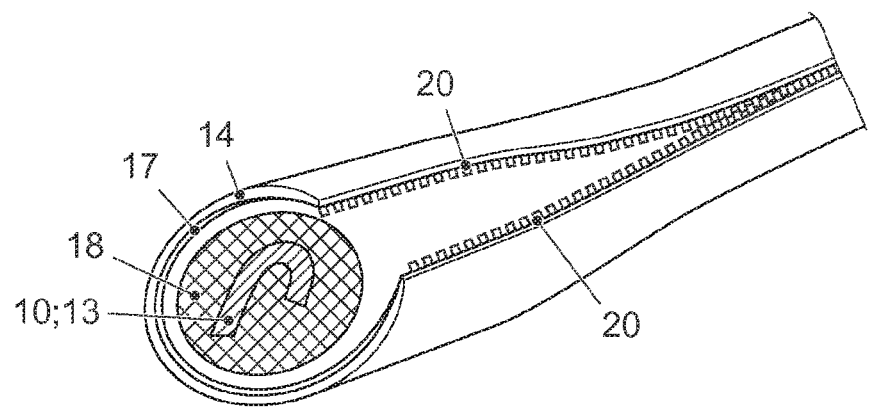
Figure 2F:
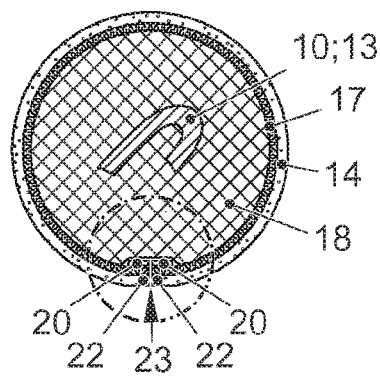

FIG. 2D shows the process step of applying the covering material 14 that has been coated and provided with the zipper halves 20 to the steering wheel skeleton 10 that has been overmolded with the matrix material 18. The application takes place in such a manner that the zipper halves 20 are arranged over the recess 19 of the matrix material 18. Next, the zipper halves 20 are closed by passing a zipper slider over the rows of teeth of the zipper halves 20 so that the teeth 21 mutually engage one another in a known manner. FIG. 2E shows the state in which the zipper is partially closed. FIG. 2F shows a sectional view through the steering wheel rim 13 with covering material 14 applied and zipper 20 already closed. It can be seen that the zipper halves 20 are accommodated in the recess 19 of the matrix 18 such that the zipper does not bulge outward in the product. It can also be seen that the longitudinal edges 22 of the covering material 14 butt against one another as abutting edges, and conceal the zipper halves 20. Thus, the zipper 20 can neither be seen nor felt in the finished steering wheel.

Figure 2G:
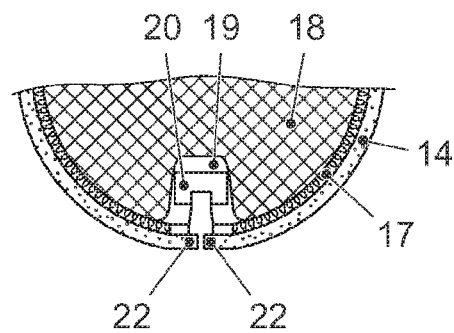

FIG. 2G shows a variant of the embodiment from FIG. 2F. Here, the recess 19 in the matrix 18 is designed with a greater depth. This makes it possible for the zipper to be pushed into the recess 19 after being closed, and thus be completely contained by the recess 19. In this variant embodiment, the zipper halves 20 are not initially concealed by the longitudinal edges 22 of the covering material 14. Instead, they are only concealed by the longitudinal edges 22 of the covering material 14 after the zipper halves have been closed and pushed into the recess 19. The use of a deeper recess 19 in the matrix 18 also permits the use of profiled zipper types, which are thicker than coil zippers. In this embodiment, as well, the zipper 20 can neither be seen nor felt in the finished steering wheel.

In contrast to the embodiments in FIG. 2E or 2F, the zipper can also be exposed, however, and hence visible. This makes it possible to create special design effects, for example with regard to color design through the use of zippers that have contrasting colors or are fluorescent.

Finally, in the embodiment of the method shown in FIG. 2 as well, the activation of the activatable material 17 takes place to produce an integral connection, in particular an adhesive connection, between the covering material 14 and the matrix 18, and to obtain the finished steering wheel 100. The joining of the longitudinal edges 22 after application of the covering material is considerably simplified through the use of the zipper in comparison with, for example, a manual stitching process. Furthermore, closure by means of a zipper has better reproducibility with regard to smaller tolerances and ensures a uniform closing force.

The finished steering wheel 100 has the following layer sequence: steering wheel skeleton 10/matrix 18/activated material 17' (integral connection)/covering material 14. Optionally, a primer can also be provided between the covering material 14 and the activatable or activated material 17, for example preventing show-through or penetration of the activatable material 17 through the covering material 14 on its visible side 15. The invention shall be explained below using concrete exemplary embodiments.

Example 1

A thermoplastic polyurethane powder was rolled or dusted onto the back side of a dermis (covering material) as the activatable material and permanently bonded to the leather as lamination by means of IR radiation. The leather thus coated was then cut to size by stamping. Zipper halves were stitched onto the longitudinal edges of the leather. The leather blank thus equipped was applied to a steering wheel rim of a steering wheel skeleton foam-coated with a polyurethane matrix, and the zipper halves were closed. Activation of the polyurethane powder took place by means of infrared irradiation at 100 to 120° C. for 5 minutes. After cooling, a uniform adhesive bond between the leather and the polyurethane matrix with high adhesive strength was obtained.

Example 2

A polyimide copolymer powder was rolled onto a carrier mesh and fused at 130° C. The laminate thus obtained was then applied to the non-visible side of leather with the application of light pressure and heat. Next, the leather was cut to size and zipper halves were stitched onto longitudinal edges of the leather blank. In one variant, no zipper halves were used. After application of the leather to a steering wheel foam-coated with a polyurethane matrix, the zipper was closed, or in the variant with no zipper the longitudinal edges were stitched. The structure was heated in an oven at 115° C. for 10 minutes to activate the polyimide copolymer powder. After cooling, a uniform and stable connection of the leather to the polyurethane matrix was obtained.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing a covered steering wheel for a vehicle, the method comprising:
   providing an overmolded steering wheel skeleton by overmolding a steering wheel skeleton with a matrix material;
   coating a covering material on a non-visible side with an activatable material to form a coated covering material;
   applying the coated covering material to the overmolded steering wheel skeleton so that the non-visible side faces the overmolded steering wheel skeleton;
   joining longitudinal edges of the coated covering material together; and
   activating the activatable material to form an integral connection between the covering material and the matrix material after the joining of the longitudinal edges of the coated covering material,
   wherein the activatable material is a foamable material that foams when activated.

2. The method according to claim 1, wherein the joining of the longitudinal edges of the coated covering material includes a closure of a zipper, the zipper including zipper halves that were attached to the longitudinal edges of the coated covering material prior to the applying of the coated covering material to the overmolded steering wheel skeleton.

3. The method according to claim 2, wherein the zipper is a coil zipper or a plastic coil zipper.

4. The method according to claim 2, wherein the matrix material enclosing the steering wheel skeleton has a recess in a region directly underneath the joined longitudinal edges of the coated covering material, the zipper being disposed inside of the recess.

5. The method according to claim 1, wherein the activatable material is an activatable adhesive, and wherein the integral connection is an adhesive bond.

6. The method according to claim 1, wherein the activating of the activatable material is accomplished by thermal treatment and/or irradiation.

7. The method according to claim 1, wherein the joining of the longitudinal edges of the coated covering material includes stitching.

8. The method according to claim 1, wherein the joining of the longitudinal edges of the coated covering material includes a closure of zipper halves of a zipper, and in a later process step includes a stitching of the longitudinal edges by overstitching of the zipper.

9. The method according to claim 1, wherein the overmolding of the steering wheel skeleton includes a foam-coating of the steering wheel skeleton with the matrix material.

10. The method according to claim 1, wherein the covering material is cut to size before or after coating and prior to application to the overmolded steering wheel skeleton.

11. The method according to claim 1, wherein, prior to the application of the coated covering material to the overmolded steering wheel skeleton, the matrix material is also coated at least in regions with the activatable material or with a different activatable material.

12. The method according to claim 1, wherein instead of the covering material, it is the matrix material that is coated on an exterior with an activatable material after the overmolding of at least sections of the steering wheel skeleton, and wherein the covering material is applied to the overmolded steering wheel skeleton so that the coated exterior of the matrix material faces the covering material.

* * * * *